May 7, 1935.  L. H. THOEN  2,000,363

MOWER

Filed Jan. 7, 1933  8 Sheets-Sheet 1

INVENTOR.
LOWELL H. THOEN
BY
ATTORNEY.

May 7, 1935.   L. H. THOEN   2,000,363
MOWER
Filed Jan. 7, 1933   8 Sheets-Sheet 2

INVENTOR.
LOWELL H. THOEN
BY
ATTORNEY.

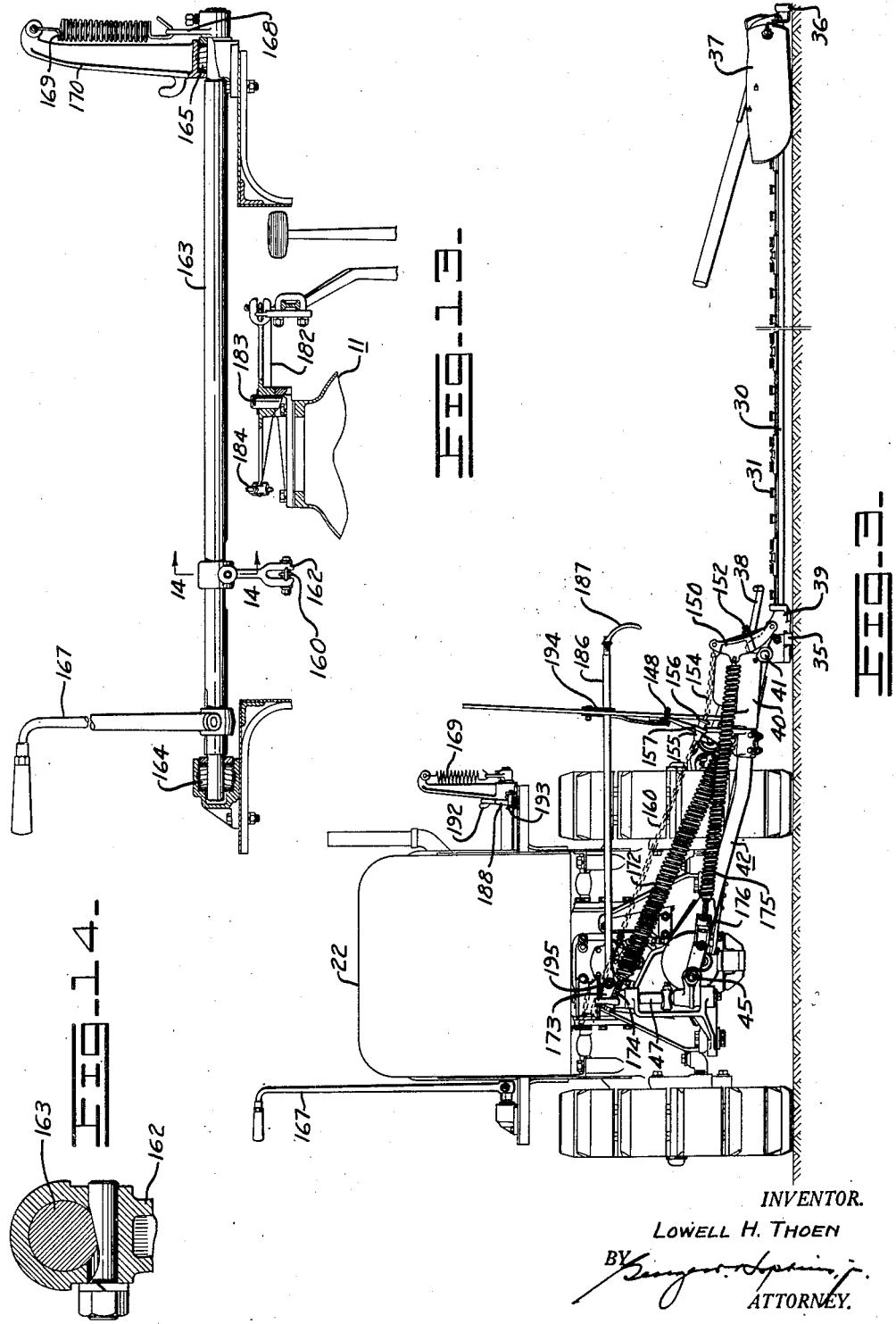

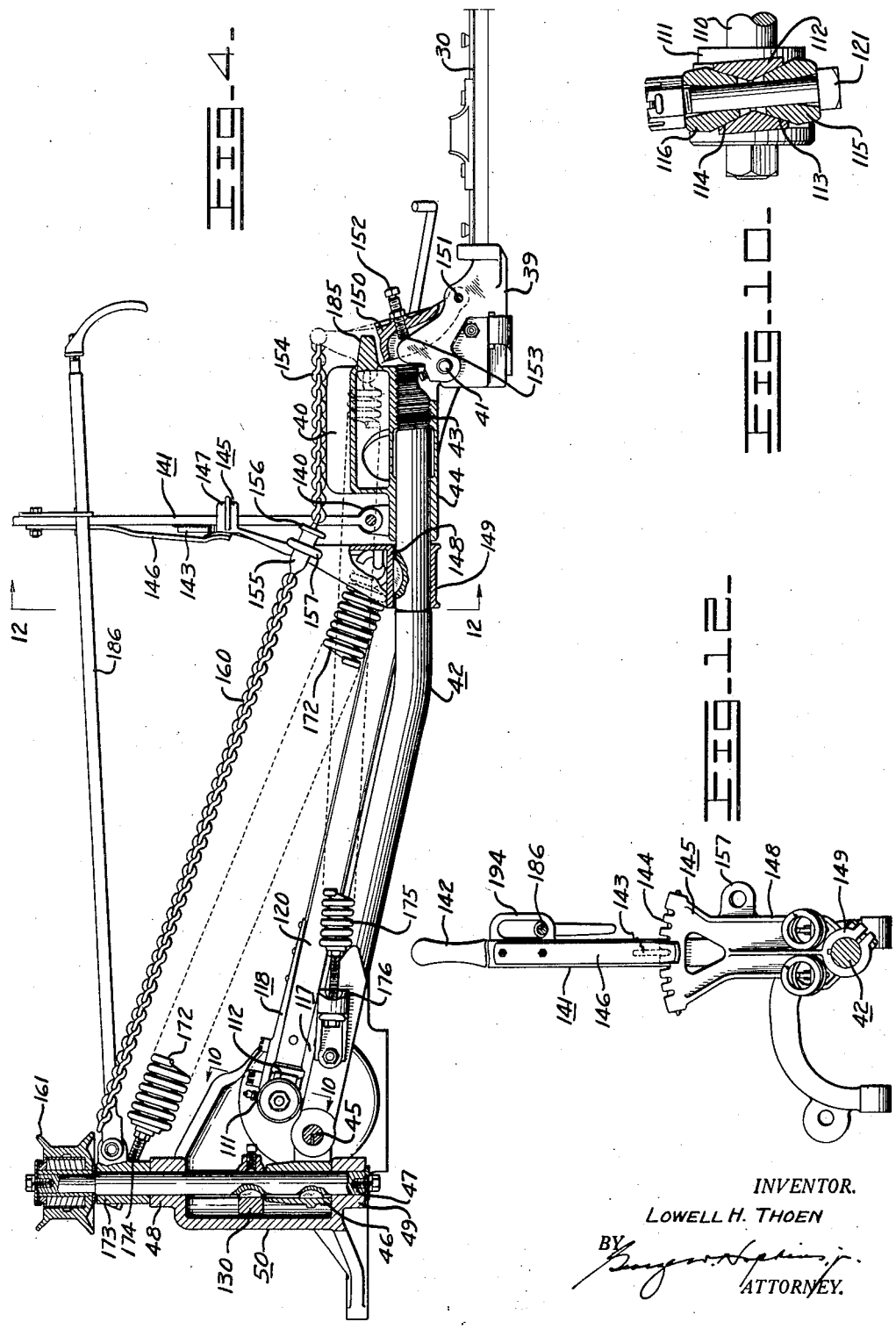

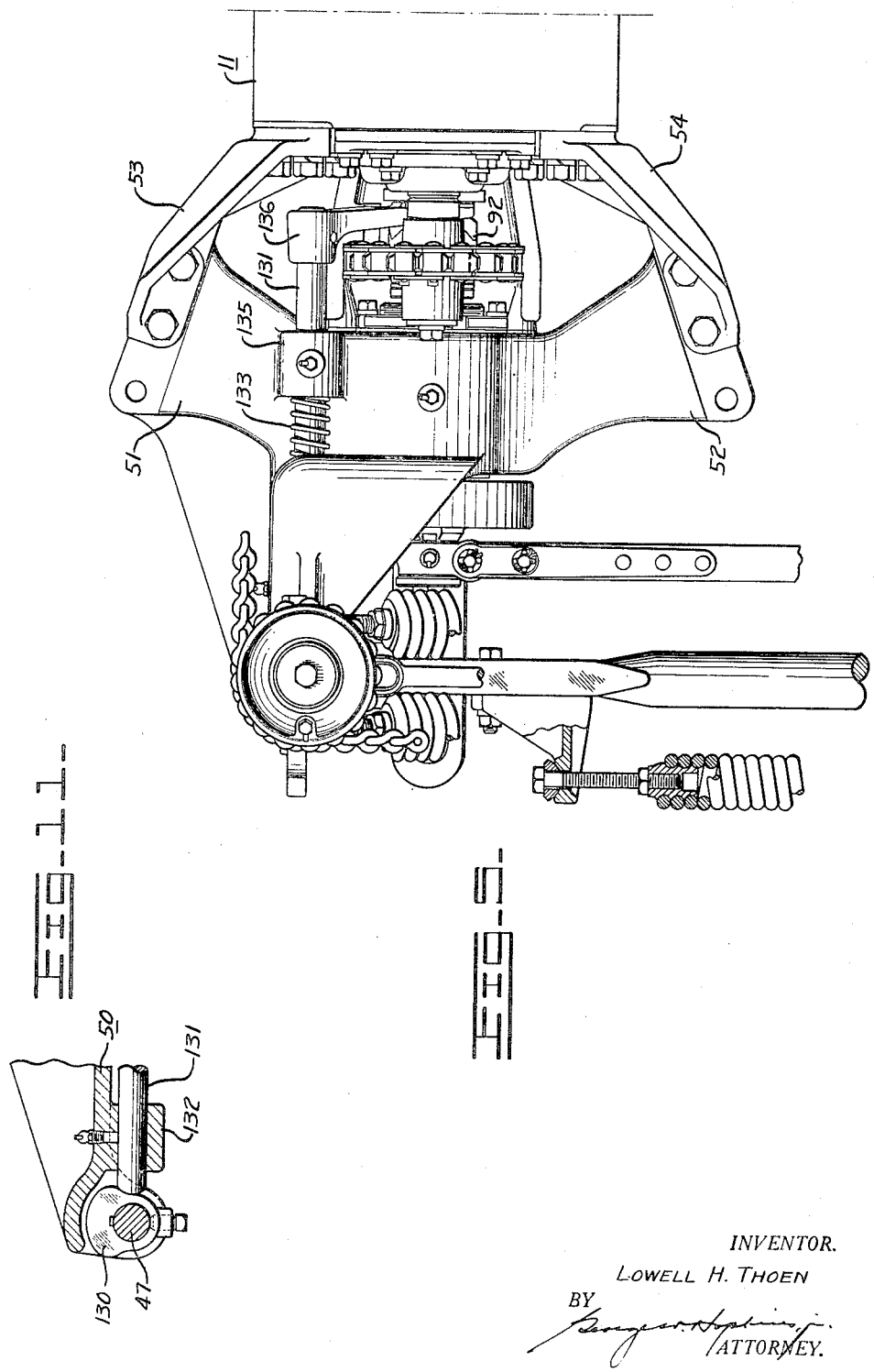

May 7, 1935. L. H. THOEN 2,000,363
MOWER
Filed Jan. 7, 1933 8 Sheets-Sheet 6
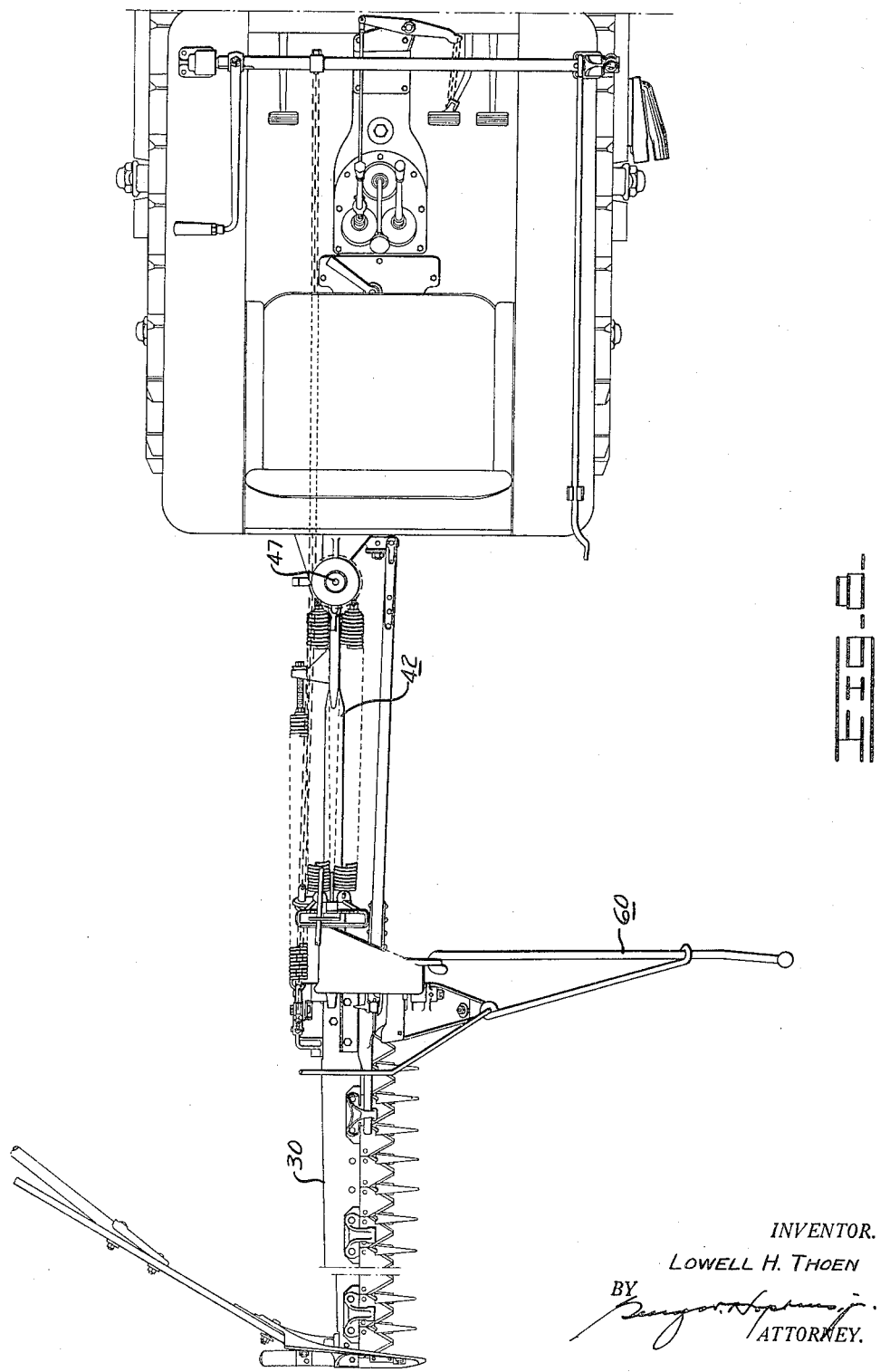
INVENTOR.
LOWELL H. THOEN
BY
ATTORNEY.

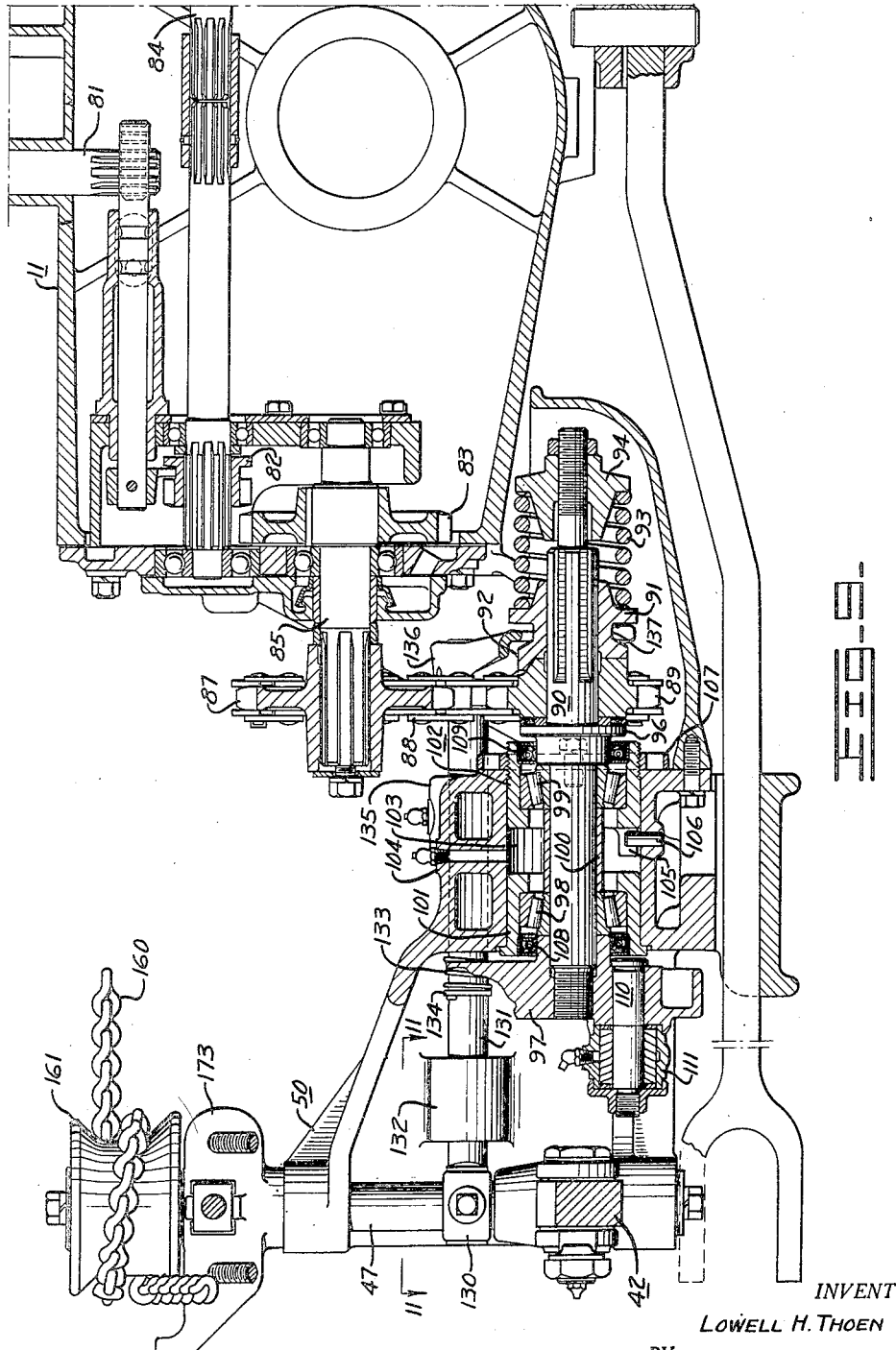

May 7, 1935. L. H. THOEN 2,000,363
MOWER
Filed Jan. 7, 1933 8 Sheets-Sheet 8

INVENTOR.
LOWELL H. THOEN
BY
ATTORNEY.

Patented May 7, 1935

2,000,363

UNITED STATES PATENT OFFICE 2,000,363

MOWER

Lowell H. Thoen, Stockton, Calif., assignor to Caterpillar Tractor Co., San Leandro, Calif., a corporation of California Application January 7, 1933, Serial No. 650,692

38 Claims. (Cl. 56—25)

One of the objects of this invention is to provide a mower which can be attached to a power driven tractor and which can be propelled by and actuated by the tractor.

Another object of the invention is to provide a mower attachment for a tractor, particularly adapted for attachment to a tractor of the track type.

Another object of the invention is to provide a mower attachment for a tractor which can be readily attached to and detached from a tractor.

Another object of the invention is to provide a mower attachment for a tractor, including a bracket means attachable to the rear end of the tractor, which will serve as a support for the mower and its operating mechanism.

Another object of the invention is to provide a mower which can be attached to the rear end of a track-type tractor and which has a draft connection to the track roller frame of the tractor.

Another object of the invention is to provide a mower which is mounted upon a vertical pivot at the rear of the tractor and which has a link connection to one of the track roller frames of the tractor.

Another object of the invention is to provide a mower which has a universal connection at the rear end of the tractor with a draft connection to one of the track roller frames of the tractor, and means on the tractor for raising and lowering the mower.

Another object of the invention is to provide a mower which can be mounted on the tractor for swinging movement, and means for normally preventing such swinging movement but permitting such swinging movement when the mower strikes an obstruction.

Another object of the invention is to provide a mower attachment for a tractor in which the cutter-bar can be lifted by elevating the outer end before elevating the inner end.

Another object of the invention is to adapt a tractor for mowing by attaching a mower thereto and arranging the tractor controls to facilitate controlling the tractor while mowing.

Another object of the invention is to provide a mower attachment for a tractor with means for lifting the cutter-bar, including means to counterbalance its weight.

Another object of the invention is to provide a mower attachment for a tractor with means for transmitting power to said mower when said mower is in an operative position and to automatically stop transmission of said power when said mower moves into an inoperative position.

Another object of the invention is to provide a track-type tractor with a mower attachment which is swingably mounted on the rear end of the tractor, which has a draft connection from the track roller frame of the tractor to the mower which normally prevents this swinging movement, which has a drive connection to the power take-off of the tractor, and which has automatic means for releasing the draft connection and the drive connections when the mower strikes obstructions.

Another object of the invention is to provide an improved means for holding a tractor mower attachment in the transporting position.

DESCRIPTION OF FIGURES

Fig. 3 is a rear elevation of the machine.

Fig. 4 is an enlarged view of a portion of the mechanism shown in Fig. 3 with parts broken away and in section.

Fig. 5 is a plan view of the mechanism attached to the rear end of the tractor.

Fig. 8 illustrates the position of the mower after it has encountered an obstruction which releases the pull rod.

Fig. 9 is a longitudinal vertical section through the rear end of the tractor and the mechanism attached thereto, taken on the line 9—9 of Fig. 1.

Fig. 10 is a fragmentary section on the line 10—10 of Fig. 4.

Fig. 11 is a fragmentary section on the line 11—11 in Fig. 9.

Fig. 12 is a section on the line 12—12 of Fig. 4

Fig. 13 is a fragmentary section on the line 13—13 in Fig. 1.

Fig. 14 is a section on the line 14—14 in Fig. 13.

DESCRIPTION OF MECHANISM

Tractor (Sheets 1 and 2)

Figure 1:
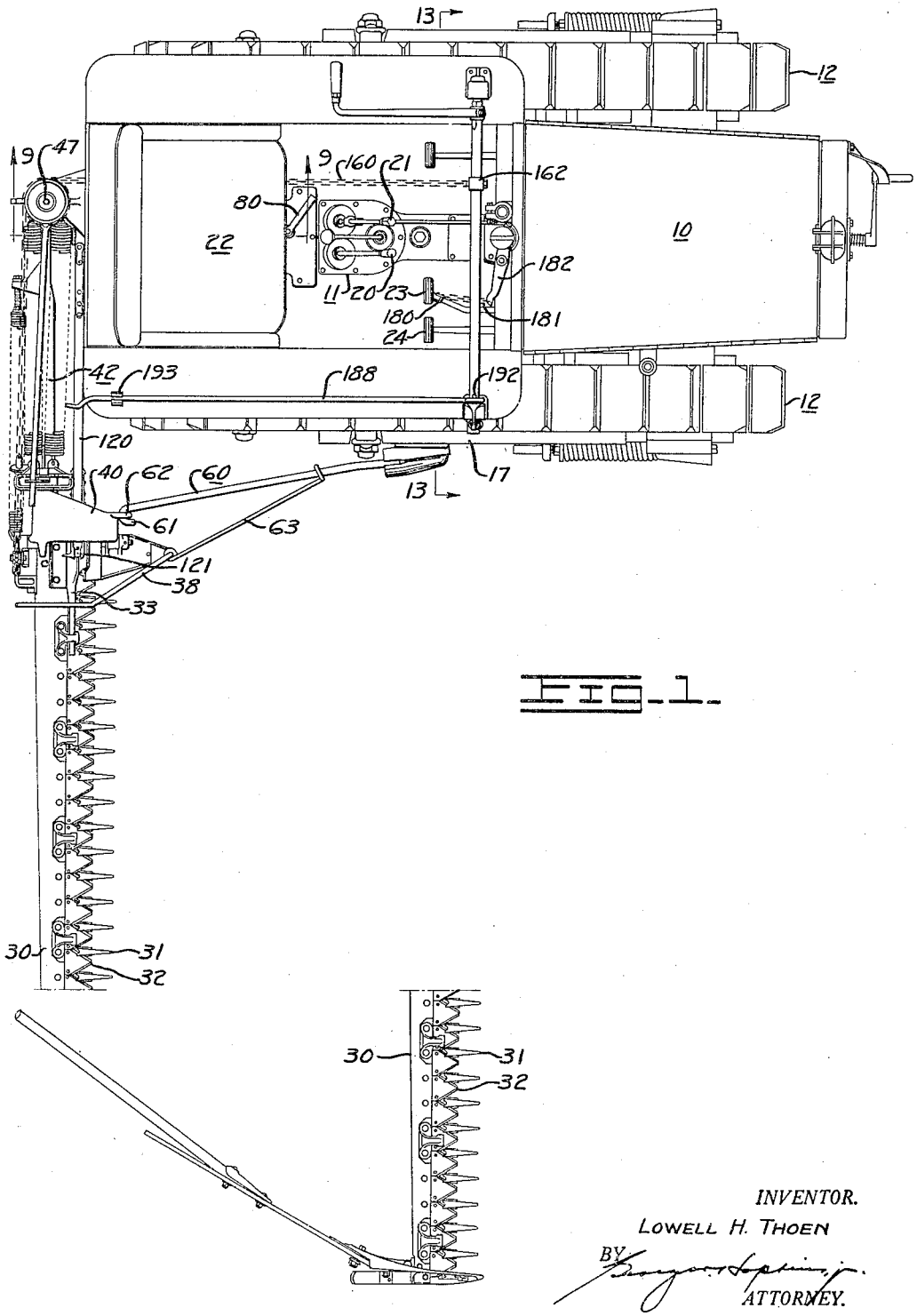
Fig. 1 is a plan view of a tractor equipped with a mower in accordance with the invention.

In the embodiment of the invention illustrated in the drawings, the mower is shown attached to a track-type tractor which comprises a power plant including an engine 10 (Fig. 1) and transmission 11, supported on a pair of track mechanisms 12, 12. Each track mechanism has an endless track 14 (Fig. 2) consisting of a series of links pivoted together. The track is laid upon the ground for the machine to roll upon. A series of rollers mounted on shafts 16 roll upon the ground run of the endless track 14 and transmit the weight of the tractor thereto. The shafts 16 are mounted in track roller frame 17 which is pivotally connected to the power plant or main frame of the tractor at 18. A sprocket 19 engages the endless track 14 to propel the tractor thereover. The sprockets 19, one for each track, are driven from the power plant of the tractor through separate clutches in a well-known manner. Control lever 20 (Fig. 1) controls the clutch for track driving sprocket 19 on the right side of the tractor. Clutch control lever 21 controls the left hand track driving sprocket 19. By manipulation of clutch control levers 20, 21, the tractor can be steered; for example, if the operator who is seated upon the seat 22 pulls left hand clutch control lever towards him, he disengages the drive to the left hand driving sprocket 19 and as a result the power is all transmitted to the right hand track, which causes the tractor to turn to the left. Operation of lever 20 causes the tractor to turn to the right.

To augment the steering operation, each of the track driving sprockets 19 has associated therewith a brake, not shown. These brakes are controlled by the foot pedals 23, 24, which operate the left and right brakes, respectively. Thus, if the operator wishes to turn the tractor sharply to the left, he pulls lever 21 to disengage the left hand clutch and also applies left hand brake by pressing on brake pedal 23.

*Mower (Sheets 1 and 3)*

The mower is attached as a unit to the rear end of the tractor (Figs. 1 and 3) and employs a conventional cutter-bar 30 having fingers 31 and a knife 32 reciprocating therein and provided with a head 33. The cutter-bar 30 (Fig. 3) is supported upon the ground by means of an inner shoe 35 and an outer shoe 36. Inner shoe 35 is adjustably mounted on a plate 39 to which cutter-bar 30 is rigidly attached. Outer shoe 36 has the usual board 37 associated therewith, and inner shoe 35 a guard 38, which members serve to guide the cut grass in a well-known manner.

*Mower support (Sheets 3-5)*

Plate 39 is connected to bracket 40 (Fig. 3) by a pivot 41. Bracket 40 (Fig. 4) is mounted on the outer end of an arm 42 which has threaded engagement therewith at 43, and bracket 40 has an extension 44 which serves to increase the bearing surface of bracket 40 on arm 42. The inner end of arm 42 is connected by a horizontal pivot 45 with a sleeve 46 keyed to a vertical shaft 47, which shaft is rotatably mounted in bosses 48, 49 of a casting 50, which constitutes a main supporting member.

Casting 50 (Fig. 5) has lateral extensions 51, 52, which are bolted to brackets 53, 54, respectively, which are attached to the rear face of the housing of transmission 11 by means of screws.

Cutter-bar 30 (Fig. 3) is capable of movement about the pivot 41, and arm 42 is capable of pivotal movement about the horizontal axis of pivot 45, and also the vertical axis of shaft 47.

*Pull rod (Sheets 1, 2 and 6)*

Arm 42 and cutter-bar 30 are normally prevented from swinging about the vertical axis of shaft 47 by a connection from bracket 40 (Fig. 1) to right hand track roller frame 17 which consists of pull rod 60, having hook 61 engaging eye 62 formed integrally with bracket 40. Member 63 has one end looped about pull rod 60 and the other end looped around guard 38 to provide an extension of guard 38. Guard extension 63 does not transmit any draft however.

The forward end of pull rod 60 (Fig. 2) terminates in a ball 64 (Fig. 7) which is received in a socket provided by the two members 65, 66. Member 66 has a nose 67 projecting into a recess 68 of member 65 to prevent substantial relative movement between parts 65 and 66 in the general direction of the axis of pull rod 60. A bolt 69, having a T-head 70, seated in a recess 71 in socket member 66, passes through apertures in socket members 65, 66, and is provided with a nut 72 against which a spring 73 presses. The inner end of spring 73 is seated in a recess 74 in socket member 65. Socket member 65 has an extension 75 (Fig. 6) which is bolted to track roller frame 17.

When the tractor is moved forwardly with the mower upon the ground, a large part of the draft force must be transmitted through pull rod 60 (Fig. 2) and its safety socket. Should the tension in pull rod 60 exceed a predetermined amount, depending upon the strength of spring 73 and the adjustment of nut 72, the spring 73 is compressed sufficiently to allow the ball 64 to escape from its socket in the members 65, 66. When this occurs, the mower swings around to the rear of the tractor as shown in Fig. 8 because when the ball and socket connection of the pull rod 60 is broken, the arm 42 and cutter-bar 30 are free to swing around the vertical axis of shaft 47. This construction is employed for safety so that if the cutter-bar strikes a post or any obstruction liable to damage the mechanism, it is allowed to swing clear of the obstruction.

The pull rod can be readily returned to its socket to resume operation, and for this purpose the socket members 65, 67 (Fig. 7) are provided at their rear ends with conical surfaces to facilitate the insertion of ball 64 into its socket.

*Knife operating mechanism (Sheets 1, 2, 3, 4, 5, 6, and 7)*

The tractor is provided with a power take-off mechanism which includes a clutch under the control of a lever 80 (Fig. 1) convenient to the operator's seat 22. This lever 80 is secured to the upper end of a shaft 81 (Fig. 9) rotatably mounted in the housing of transmission 11. It will be evident from an inspection of Fig. 9 that oscillation of shaft 81 will result in engaging and disengaging pinion 82 with gear 83 to connect and disconnect upper transmission shaft 84 from power take-off shaft 85. This mechanism is disclosed in the patent to Harmon S. Eberhard, No. 1,982,727, dated December 4, 1934.

Sprocket 87 is splined on power take-off shaft 85 and is connected by chain 88 with sprocket 89, rotatably mounted on shaft 90 and normally connected thereto by clutch element 91, having teeth 92 engaging with corresponding teeth formed in the hub of sprocket 89. These teeth are resiliently maintained in contact by means of spring 93 which bears against a flange on clutch element 91 and against a flange on nut 94, threaded on shaft 90. Clutch element 91 is splined on shaft 90 so that power is transmitted from shaft 85 to shaft 90 through sprocket 87, chain 88, sprocket 89, clutch teeth 92 and clutch element 91. The amount of torque transmitted through clutch 91 is adjusted by positioning nut 94 to control the pressure of spring 93. Consequently, clutch 91 acts as a safety device to protect the mower mechanism.

Adjacent sprocket 89, shaft 90 is provided with a flanged collar 96 which serves to prevent axial displacement of sprocket 89 under the action of spring 93. The rear end of shaft 90 has threaded thereon a flywheel 97. Intermediate the inwardly extending hub of flywheel 97 and collar 96 are bearings 98, 99 separated by spacer 100. Bearings 98, 99 are assembled in sleeves 101, 102 slidably mounted in bore 103 of body 104 of casting 50. Sleeve 102 has inwardly extending lugs 105 engaging pin 106 in body 104. Nut 107 threaded on sleeve 102 serves to adjust bearings 98, 99. Bearings 98, 99 are protected by seals 108, 109 fixed in sleeves 101, 102, respectively, and contacting the hub of flywheel 97 and collar 96, respectively.

Flywheel 97 is threaded on shaft 90 in a direction to cause tightening of the flywheel on the shaft upon transmission of power from the shaft to the flywheel. A crank pin 110 is mounted in flywheel 97, and the member 111 is journaled on crank pin 110. Member 111 (Fig. 4) has an extension 112 formed thereon which is apertured, as shown in Fig. 10, to provide conical seats 113, 114 for projections 115, 116 on straps 117, 118, respectively, (Fig. 4) which are secured to a pitman 120. Projections 115, 116 (Fig. 10) have conical surfaces engaging the conical seats 113, 114, of extension 112, and are apertured to receive a bolt 121 which serves to maintain projections 115, 116 in their seats 113, 114. When pitman 120 moves relatively to member 111, the movement is a rotation about the axis of conical seats 113, 114, which axis is disposed at an angle of approximately 5° to the axis of crank pin 110 (Fig. 10).

The outer end of pitman 120 (Figs. 1 and 2) has a ball and socket connection 121 with the knife head 33.

The purpose of the special joint between the pitman and the crank pin is to permit the mower to rest upon the ground after pull rod 60 has pulled out of its socket (Fig. 8). It is also desirable to disconnect the drive to the knife when this occurs, and for this purpose shaft 47 (Fig. 4) has a cam 130 keyed thereon. It will be recalled that when the pull rod is disconnected from the track roller frame the cutter-bar 30 and arm 42 are free to swing rearwardly. This causes rotation of shaft 47, and, consequently, movement of cam 130 which engages a push rod 131 (Figs. 9 and 11) slidably mounted in an apertured boss 132 formed in casting 50. Push rod 131 is resiliently urged against cam 130 by spring 133 (Fig. 5) which presses against a washer 134 (Fig. 9) pinned to push rod 131 and against the rear face of boss 135 (Fig. 5) in which push rod 131 has bearing. The forward end of push rod 131 has pinned thereto a fork 136 which engages groove 137 (Fig. 9) in clutch element 91.

The rotation of cam 130, resulting from rearward swinging of arm 42, causes disengagement of clutch 91, thereby interrupting the transmission of power from the power take-off shaft to the knife.

Correct registration of knife 32 (Fig. 1) with fingers 31 is obtained by screwing bracket 40 (Fig. 4) in or out on arm 42.

*Adjusting mechanism (Sheets 1, 2, 4, 5, and 6)*

The inclination of the cutter-bar to the ground may be adjusted, and for this purpose bracket 40 has pivotally mounted in ears 140 (Fig. 4), formed integrally with bearing extension 44, a lever 141. Lever 141 is provided with a suitable operator's handle 142 (Fig. 12) and a tooth 143 adapted to be engaged with the teeth 144 of a segment 145, and maintained in engagement therewith by means of a spring 146 secured to lever 141. Segment 145 has a guide 147 (Fig. 4) for lever 141 formed integrally therewith, and segment 145 is integral with a bracket 148 having a split hub 149 (Fig. 12) clamped and keyed to arm 42.

To adjust the plane of cutter-bar 30 (Fig. 2), with respect to the surface of the ground, the operator grasps the handle 142 of lever 141 and rocks the lever outwardly against the action of spring 146 to disengage tooth 143 from teeth 144 and then moves the lever forwardly or rearwardly in the guide 147 to rotate the bracket 40 with respect to the arm 42. When the cutter-bar has been adjusted to the desired position, the handle 142 is released and the spring 146 rocks the lever 141 on its pivot to engage its tooth 143 with the teeth 144 to lock the bracket 40 and the cutter-bar 30 in adjusted position with respect to the arm 42.

A mechanism is provided for lifting the cutter-bar off the ground. For this purpose a lever 150 (Fig. 3) is connected to the plate 39 attached to cutter-bar 30. Lever 150 (Fig. 4) has a pivotal connection 151 with plate 39 and a set screw 152 which bears against a shoulder 153 on plate 39. The upper end of lever 150 has a chain 154 connected thereto, the other end of which is connected to a cylindrical member 155 having a flange 156. Member 155 passes through an eye 157 (Fig. 12) formed integrally with bracket 148.

One end of chain 160 (Fig. 4) is connected to member 155 and passes about a sheave 161 rotatably mounted on the upper end of vertical shaft 47 and extends beneath seat 22 (Fig. 1) forwardly to a lever 162 (Fig. 13) attached to transverse shaft 163 mounted in bearings 164, 165 mounted on the mud guards of the tractor. An operating lever 167 is secured to the left end of shaft 163 (Fig. 13). Adjustably secured to the right end of shaft 163 (Fig. 2) is an arm 168 from which a spring 169 extends upwardly to a bracket 170 (Fig. 13) formed integrally with the bracket for mounting bearing 165.

Spring 169 (Fig. 3) is adjusted to maintain a slight tension in chain 160. When the operator pulls lever 167 toward seat 22, chain 154 through lever connection 150 lifts cutter-bar 30 about its pivot 41 and continues to do so until flange 156 of cylindrical member 155 engages eye 157 on bracket 148 when further movement of operating lever 167 and chain 160 causes upward swinging of arm 42 and cutter-bar 30 as a unit about pin 45 as an axis. By adjusting set screw 152, the lost motion between flange 156 and eye 157 may be adjusted to obtain any degree of preliminary elevation of the outer end of cutter-bar 30 prior to elevation of the arm and cutter-bar as a unit.

It has been found to facilitate the elevation of the cutter-bar as a whole to start raising the outer end prior to raising the inner end. Obviously the lever 150 could be adjusted by means of the set screw 152 so that the flange is normally in contact with the eye 157, so that upon operation of operating lever 167 both ends of cutter-bar 30 begin to rise at once.

To further facilitate lifting of the cutter-bar, a pair of springs 172 (Figs. 2, 3) are attached to bracket 148 (Figs. 4, 12) at one end, and to a bracket 173 by means of adjusting screws 174 at the other end. Bracket 173 (Fig. 4) has a hub which encircles shaft 47 and is interposed between boss 48 and sheave 161. Springs 172 (Fig. 3) are adjusted by means of screws 174, so that they almost counterbalance the weight of the arm and cutter-bar assemblies about the pin 45 as an axis, and so that inner shoe 35 of cutter-bar 30 rests lightly upon the ground.

A spring 175 (Figs. 3 and 4) is attached at one end to lever 150 and at the other end to arm 42 by means of an adjustable connection 176. Spring 175 serves to counterbalance the weight of cutter-bar 30 about pivot pin 41 and its tension is adjusted by means of the adjustable connection 176, so that the outer shoe 36 of cutter-bar 30 rests lightly upon the ground. With the springs 172, 175, properly adjusted, the operator can easily and quickly raise and lower the cutter-bar 30 by manipulating the lever 167.

*Tractor controls for mowing (Sheets 1, 2 and 3)*

Due to the fact that the cutter-bar is disposed at one side of the tractor (Fig. 1), there is a tendency for the tractor to veer to the right as it is pulling the mower through the field. To facilitate maintaining the direction of movement of the tractor in a straight line, the left hand brake pedal 23 is connected to the left hand clutch control lever 21 so that when the operator pulls lever 21 to release the left hand track 12 and to bring the tractor back into line, the left hand brake is automatically applied so that the tractor will quickly respond to the steering lever. This arrangement is also necessary under certain conditions where the tendency of the mower to pull the tractor out of line is great, to insure overcoming this tendency because at times the pull of the mower is so great that merely releasing the left hand clutch will not straighten the tractor out, and it becomes necessary under such conditions to apply the left hand brake, in addition to releasing the clutch. For these reasons it has been found necessary to interconnect pedal 23 and lever 21 in the following manner: A clamp 180 (Fig. 1) is attached to brake pedal 23. A chain 181 connects clamp 180 to one arm of a lever 182 (Fig. 13) which is pivoted intermediate its ends at 183 on the transmission 11. The other end of lever 182 is connected by an adjustable link 184 to a collar 179 (Fig. 2) attached to steering clutch lever 21. By this arrangement, movement of lever 21 towards operator's seat 22 causes depression of pedal 23.

*Miscellaneous (Sheets 1, 2, 3, 4 and 8)*

Figure 6:
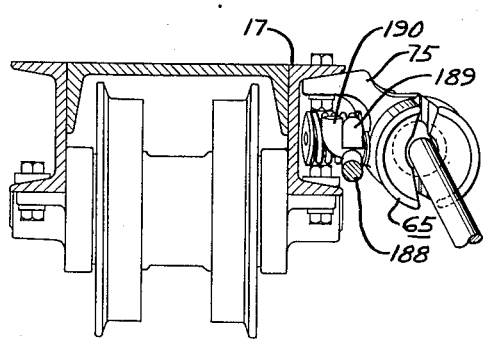
Fig. 6 is a view of one of the details taken from the line 6—6 in Fig. 2.
Figure 7:
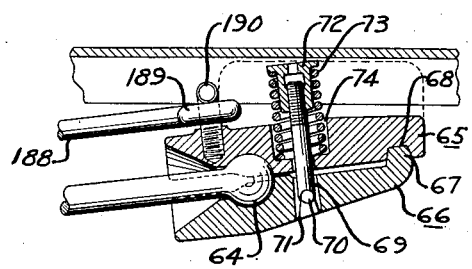
Fig. 7 is a fragmentary section on the line 7—7 in Fig. 2.
Figure 15:
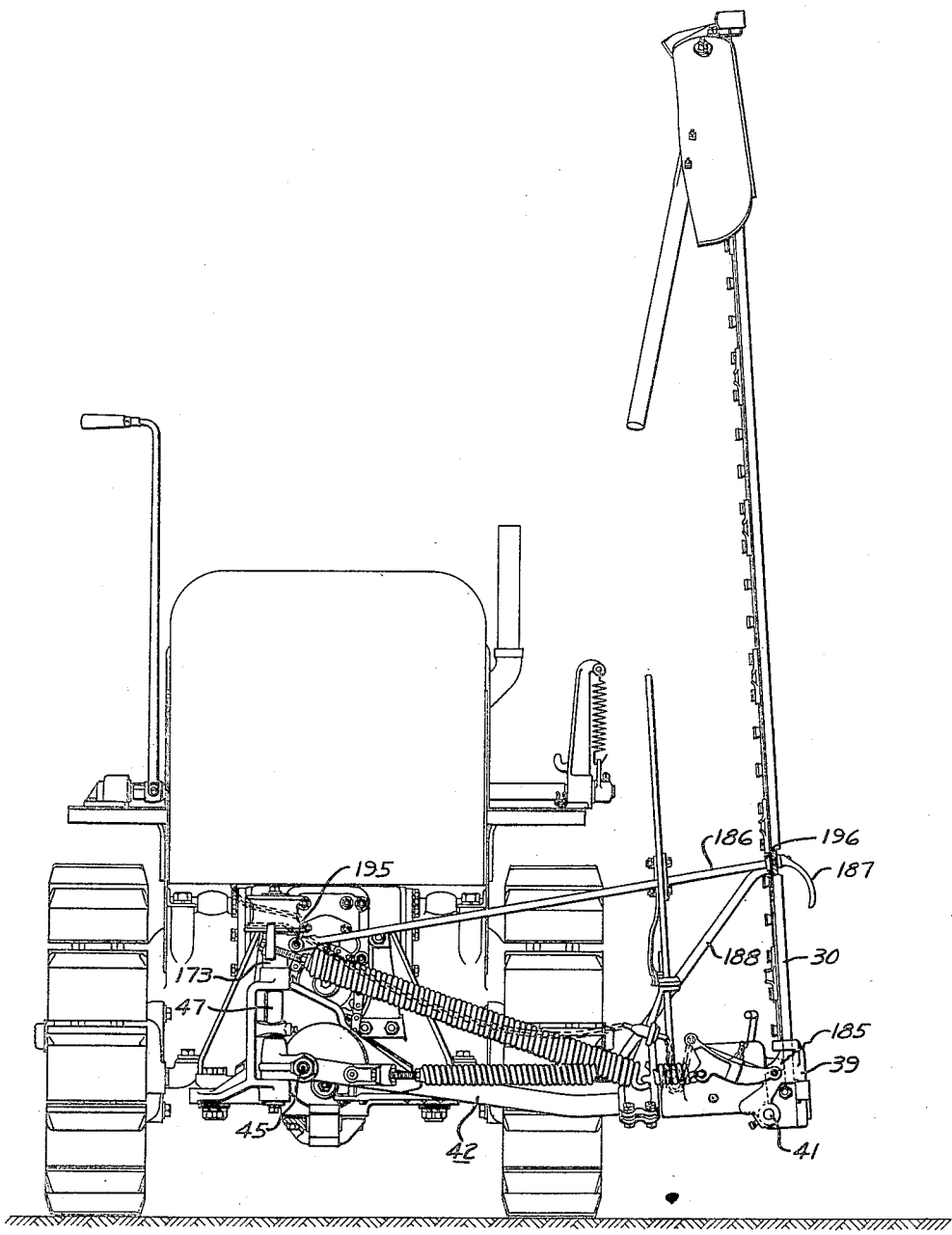
Fig. 15 illustrates the position of the mower when in inoperative position for transportation.

When the mower is not in operation, the cutter-bar is elevated to a substantially vertical position, as illustrated in Fig. 15, where it will be seen that the cutter-bar 30 and its plate 39 have been rotated about their pivot 41 through substantially 90°, until the cutter-bar contacts a stop member 185 formed on housing 40 (Fig. 4). There is a brace rod 186 (Fig. 3) the inner end of which is pivotally connected at 195 to bracket 173 on shaft 47 and which rests in the slot of a keeper 194 (Fig. 12) attached to lever 141. A handle 187 (Fig. 3) is screwed on the outer end of rod 186. When the cutter-bar is placed in the position shown in Fig. 15, handle 187 is removed from rod 186, the end of the rod is passed through an aperture in cutter-bar 30, and the handle 187 is screwed back on again to retain the cutter-bar in place. This arrangement not only maintains the cutter-bar in the vertical position and maintains the arm 42 in the elevated position shown in Fig. 15 where it is raised from the ground, but it keeps the parts in these relative positions. That is, the arm 42 and the cutter-bar 30 can have no movement in a vertical plane with respect to the body of the tractor. This is so because when the handle 187 is screwed on the rod 186, the cutter-bar 30 is pressed against the stop 185 so that the arm 42 and the cutter-bar 30 must move, if at all, as a unit, because no relative movement can take place at the pivot 41. The arm 42 is pivoted at 45 and the rod 186 is pivoted at 195 so that the parts can be analyzed as a locked kinematic chain, of which the stationary link contains the pivot points 45 and 195. The second link is the rod 186 pivoted to the first link at 195, and the third link is the unit comprising the arm 42 and the cutter-bar 30, pivoted to the first link at 45 and to the second link 186. These three links are connected together, and, therefore, constitute a locked kinematic chain. No one of the links can have any movement with respect to any of the other links. To prevent the unit from swinging around the axis of vertical shaft 47, a second brace 188 is placed between the cutter-bar 30 and the pull rod socket on the track roller frame. As shown in Figs. 6 and 7, the inner end of brace 188 has an eye 189 which can be hooked over a hook 190 attached to socket members 65. The other end of brace 188 (Fig. 15) has an eye 196 through which the end of brace rod 186 is passed before it is passed through cutter-bar 30.

Figure 2:
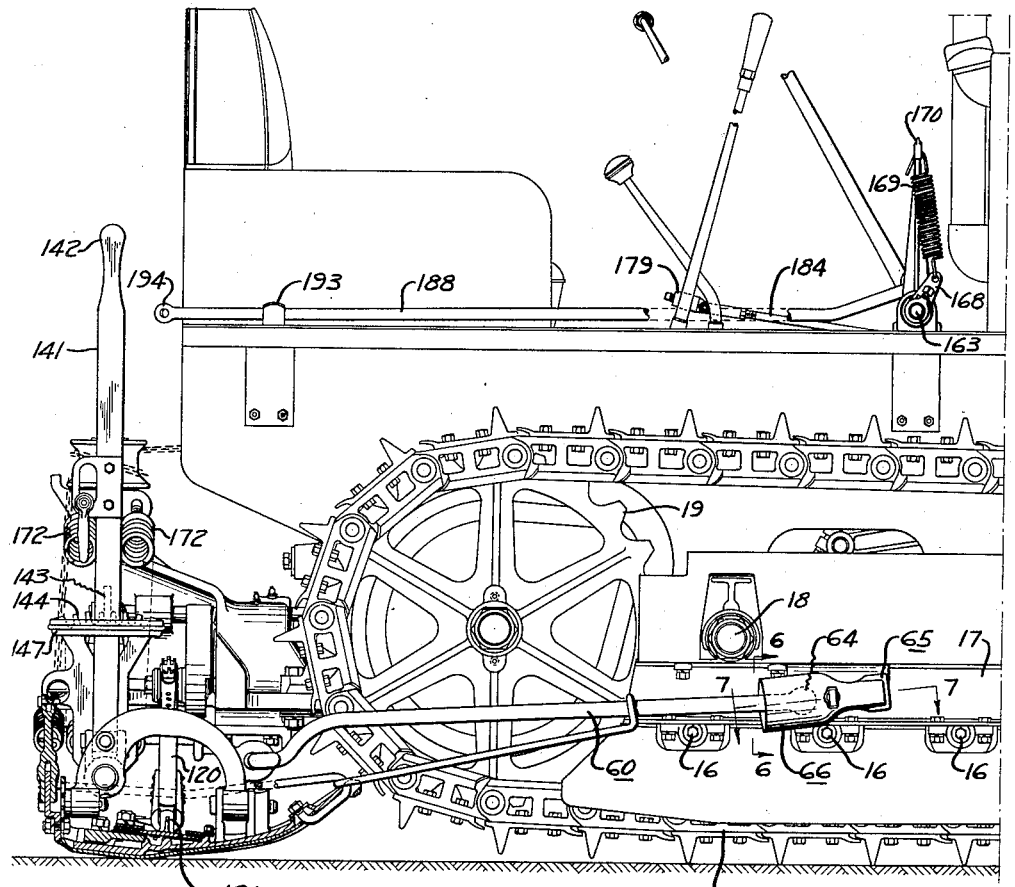
Fig. 2 is a right side elevation of the rear of the machine.

Braces 186 and 188 are, of course, removed when the mower is to be put into operation. Brace 186 is left in the position shown in Fig. 3, and the brace 188 is mounted as shown in Figs. 1, 2, and 3, there being a hook 192 provided on bracket 170, and a clamp 193 mounted on the mud guard of the tractor.

I, therefore, claim as my invention:

1. A mower attachment for a tractor having an endless track, rollers running on said track, and a frame resting on said rollers, comprising cutting means, a connection from said cutting means to the rear end of said tractor, said connection permitting said cutting means to have a swinging movement about a vertical axis and over the ground, and a releasably secured draft connection from said cutting means to said track roller frame operable to prevent said swinging movement unless a predetermined tension is exceeded in said draft connection.

2. A mower attachment for a tractor having a power plant, an endless track, rollers running on said track, and a frame resting on said rollers, said attachment comprising a bracket attachable to said power plant, an arm pivoted on said bracket for movement about a vertical axis to allow horizontal swinging of said arm, a cutter-bar, means to connect said cutter-bar to said arm for pivotal movement with respect thereto, a link releasably connected to said track roller frame, and means to connect said link to said cutter-bar.

3. A mower attachment for a tractor having a power plant, said attachment comprising a bracket attachable to said power plant, an arm pivoted on said bracket, a cutter-bar, means to connect said cutter-bar to said arm for pivotal movement with respect thereto, a knife reciprocable in said cutter-bar, a pitman for operating said knife, a crank for operating said pitman, and means to transmit power from said power plant to said crank, including a shaft mounted in said bracket, said crank being connected to said shaft, a shaft mounted in said power plant and driven thereby, and means to transmit power from one shaft to the other, including a clutch, and automatic means to limit the torque transmitted by said clutch.

4. A mower attachment for a tractor having a power plant, said attachment comprising a bracket attachable to said power plant, an arm pivoted on said bracket, a cutter-bar, means to connect said cutter-bar to said arm for pivotal movement with respect thereto, a knife reciprocable in said cutter-bar, a pitman for operating said knife, a crank for operating said pitman, and means to transmit power from said power plant to said crank, including a shaft mounted in said bracket, said crank being connected to said shaft, a shaft mounted in said power plant and driven thereby, and means to transmit power from one shaft to the other, including a clutch, and means operable by said arm for disengaging said clutch.

5. A mower for use with a tractor, comprising a cutter-bar, an arm, means to connect said cutter-bar to said arm for pivotal movement about an axis, means to connect said arm to said tractor for pivotal movement about a second axis, and spring means connecting said cutter-bar to said arm to counterbalance the moment of weight of the cutter-bar about said first axis.

6. A mower for use with a tractor, comprising a cutter-bar, an arm, means to connect said cutter-bar to said arm for pivotal movement about an axis, means to connect said arm to said tractor for pivotal movement about a second axis, and spring means connecting said arm to said tractor to counterbalance the moment of weight of said arm and said cutter-bar about said second axis.

7. A mower for use with a tractor, comprising a cutter-bar, an arm, means to connect said cutter-bar to said arm for pivotal movement about an axis, means to connect said arm to said tractor for pivotal movement about a second axis, spring means connecting said cutter-bar to said arm to counterbalance the moment of weight of the cutter-bar about said first axis, and spring means connecting said arm to said tractor to counterbalance the moment of weight of said arm and said cutter-bar about said second axis.

8. A mower for use with a tractor, comprising a cutter-bar, an arm, means to connect said cutter-bar to said arm for pivotal movement about an axis, means to connect said arm to said tractor for pivotal movement about a second axis substantially parallel to said first axis, and a lifting device to cause movement of said arm and said cutter-bar about said axes.

9. A mower for use with a tractor, comprising a cutter-bar, an arm, means to connect said cutter-bar to said arm for pivotal movement about an axis, means to connect said arm to said tractor for pivotal movement about a second axis, and a lifting device to cause a selected movement of said cutter-bar about said first axis and upon completion of said selected movement to cause movement of said cutter-bar and said arm about said second axis.

10. A mower attachment for a tractor having a power plant mounted on a pair of endless track mechanisms, an operator's seat, a pair of clutch control levers adjacent said seat to enable the operator in said seat to control the transmission of power to said track mechanisms, a pair of brake pedals adjacent said seat to enable the operator in said seat to apply a braking action to said track mechanisms, said attachment comprising cutting means, draft and drive connections from said cutting means to said tractor, a lift mechanism for said cutting means, including an operating member adjacent said seat, a control for said cutting means drive adjacent said seat, and means to connect one of said brake pedals to one of said clutch control levers.

11. A mower for use with a tractor, comprising a cutter-bar, an arm, means to connect said cutter-bar to said arm for pivotal movement about an axis, means to connect said arm to said tractor for pivotal movement about a second axis, a link, means to connect one end of said link to said tractor, means to connect the other end of said link to said cutter-bar, and a device, attached to said means to connect said cutter-bar to said arm, cooperating with said link to prevent movement of said cutter-bar about said first axis.

12. A mower attachment for a tractor having a power plant, comprising a bracket attachable to said power plant, an arm pivoted on said bracket, a cutter-bar, means to connect said cutter-bar to said arm for pivotal movement with respect thereto, including a member rotatably mounted on said arm, a knife reciprocable in said cutter bar, a pitman for operating said knife, a crank for operating said pitman, means to transmit power from said power plant to said crank, selective rotation of said member on said arm serving to adjust the inclination of the plane of said cutter-bar to the ground and to locate said knife with respect to said cutter-bar.

13. The combination with a tractor having a rear power take-off device, of a mower attachment therefor, comprising a cutting means supporting structure, means for connecting said structure to the rear of said tractor and adjacent said power take-off device for swinging movement in a plane substantially parallel to the ground, so that said structure can move from a lateral position transverse with respect to the line of draft of said tractor to a position in back of said tractor in the direction of said line of draft, and an automatically releasable draft member at the side of said tractor and connected to a side of said tractor and to said structure.

14. The combination with a tractor having a rear power take-off device, of a mower attachment therefor, comprising a cutting means supporting structure, means for connecting said structure to the rear of said tractor and adjacent said power take-off device for both pivotal movement in an upright plane and swinging movement in a plane substantially parallel to the ground, a releasable draft member at the side of said tractor and connected to a side of said tractor and to said structure, and a lifting device for effecting said pivotal movement of said structure in said upright plane.

15. The combination with a tractor having a rear power take-off device, of a mower attachment therefor, comprising a cutting means supporting structure, means for connecting said structure to the rear of said tractor and adjacent said power take-off device for both pivotal movement in an upright plane and swinging movement in a plane substantially parallel to the ground, a releasable draft member at the side of said tractor and connected to a side of said tractor and to said structure, a lifting device for effecting said pivotal movement of said structure in said upright plane, and a control for said lifting device positioned adjacent the operator's seat of said tractor.

16. The combination with a tractor having a rear power take-off device, of a mower attachment therefor, comprising a cutting means supporting structure having a jointed connection intermediate its ends allowing upright movement of an outer portion of said structure relative to an inner portion thereof, means for connecting the inner end of said structure to the rear of said tractor and adjacent said power take-off device for both pivotal movement in an upright plane and swinging movement in a plane substantially parallel to the ground, an automatically releasable draft member at the side of said tractor and connected to a side of said tractor and to said structure, and a lifting device for effecting upright movement of the outer portion and then the inner portion of said structure.

17. The combination with a track-type tractor having a track frame at each side of the tractor and a rear power take-off device, of a mower attachment therefor, comprising a cutting means supporting structure, means for connecting said structure to the rear of said tractor and adjacent said power take-off device for swinging movement in a plane substantially parallel to the ground, so that said structure can move from a lateral position transverse with respect to the line of draft of said tractor to a position in back of said tractor in the direction of said line of draft, a draft member extending forwardly from said structure, and means connecting said draft member to a track frame and to said structure, said latter means including a connecting device automatically releasable to allow said swinging movement when said structure strikes an obstruction.

18. The combination with a track-type tractor having a track frame at each side of the tractor and a rear power take-off device, of a mower attachment therefor, comprising a cutting means supporting structure, means for connecting said structure to the rear of said tractor and adjacent said power take-off device for both pivotal movement in an upright plane and swinging movement in a plane substantially parallel to the ground, a draft member extending forwardly from said structure and at a side of one of said track frames, means connecting said draft member to said one track frame and to said structure, said latter means including a connecting device automatically releasable to allow said swinging movement, and a lifting device for effecting said pivotal movement in an upright plane.

19. In a machine of the class described, a draft member and an automatically releasable connection therefor, said connection comprising a plurality of clamping members forming a socket adapted to receive a portion of said draft member, and resilient means for holding said clamping members together to clamp said portion of said draft member.

20. The combination with a track-type tractor having a track frame, of a mower attachment therefor, means connecting said attachment to the tractor, a draft member from said attachment to said track frame, and an automatically releasable connection for said draft member, said connection comprising a plurality of clamping members mounted on said track frame and forming a socket adapted to receive an end portion of said draft member, and resilient means for holding said clamping members together to clamp said end portion of said draft member.

21. A mower attachment adapted to be secured to a vehicle having a power take-off device, comprising a supporting structure adapted to be secured to said vehicle adjacent said power take-off device, a drive mechanism mounted on said supporting structure and having means for driving connection with said power take-off device, an upright shaft journaled for rotatable movement in said supporting structure, a cutting mechanism supported for rotatable movement with said shaft, and a connection from said drive mechanism to said cutting mechanism.

22. A mower attachment adapted to be secured to a vehicle having a power take-off device, comprising a supporting structure adapted to be secured to said vehicle adjacent said power take-off device, a drive mechanism mounted on said supporting structure and having means for driving connection with said power take-off device, an upright shaft journaled for rotatable movement in said supporting structure, a cutting mechanism pivotally mounted on said shaft for movement in an upright plane and supported for rotatable movement with said shaft, and a connection from said drive mechanism to said cutting mechanism.

23. A mower attachment adapted to be secured to a vehicle having a power take-off device, comprising a supporting structure adapted to be secured to said vehicle adjacent said power take-off device, a drive mechanism mounted on said supporting structure and having means for driving connection with said power take-off device, said driving connection including clutching means, an upright shaft journaled for rotatable movement in said supporting structure, a cutting mechanism supported for rotatable movement with said shaft, a connection from said drive mechanism to said cutting mechanism, and means actuated by rotation of said shaft from one position to another position for automatically disengaging said clutching means.

24. A mower attachment adapted to be secured to a vehicle having a power take-off device, comprising a supporting structure adapted to be secured to said vehicle adjacent said power take-off device, a drive mechanism mounted on said supporting structure and having means for driving connection with said power take-off device, an upright shaft journaled for rotatable movement in said supporting structure, a cutting mechanism pivotally mounted on said shaft for movement in an upright plane and supported for rotatable movement with said shaft, a connection from said drive mechanism to said cutting mechanism, a wheel on said shaft, a flexible member connected to said cutting mechanism and passing about said wheel, and means for moving said flexible member to effect lifting of said cutting mechanism in said upright plane.

25. A mower attachment adapted to be secured to a vehicle having a rear power take-off device, comprising a supporting structure adapted to be secured to the rear of said vehicle adjacent said power take-off device, a drive mechanism mounted on said supporting structure and having means for driving connection with said power take-off device, an upright shaft journaled for rotatable movement in said supporting structure, a cutting mechanism supported for rotatable movement with said shaft, a connection from said drive mechanism to said cutting mechanism, and a draft member connected to said cutting mechanism and adapted to be connected to a side of said vehicle independent of said supporting structure.

26. A mower attachment adapted to be secured to a vehicle, comprising a supporting structure, an arm mounted adjacent one end on said structure for movement in an upright plane, a cutting mechanism mounted for movement in said upright plane and movably connected to said arm adjacent the opposite end of said arm, and a lift mechanism arranged to effect first lifting of said cutting mechanism and then lifting of said arm in said upright plane.

27. A mower attachment adapted to be secured to a vehicle, comprising a supporting structure, an arm mounted adjacent one end on said structure for movement in an upright plane, a cutting mechanism mounted for movement in said upright plane and movably connected to said arm adjacent the opposite end of said arm, a lift mechanism arranged to effect first lifting of said cutting mechanism and then lifting of said arm in said upright plane, and spring counterbalancing means comprising a spring connected to said arm and to said cutting mechanism, and a spring connected to said arm and to said supporting structure.

28. A mower attachment adapted to be secured to a vehicle, comprising a supporting structure, an arm mounted adjacent one end on said structure for movement in an upright plane, a cutting mechanism mounted for movement in said upright plane and movably connected to said arm adjacent the opposite end of said arm, a lift mechanism arranged to effect first lifting of said cutting mechanism and then lifting of said arm in said upright plane, and means for regulating the extent of lifting of said cutting mechanism prior to lifting of said arm.

29. A mower attachment adapted to be secured to a vehicle, comprising a supporting structure, an arm mounted adjacent one end on said structure for movement in an upright plane, a cutting mechanism mounted for movement in said upright plane and movably connected to said arm adjacent the opposite end of said arm, a lever movably connected to said cutting mechanism adjacent said opposite end of said arm, and a lifting connection attached to said lever.

30. The combination with a track-type tractor having an endless track at each side of the tractor, a steering clutch and a brake for each track, of a mower attached to said tractor and extending laterally therefrom thereby causing the tractor to veer from a straight course, and an interconnection between the steering clutch and the brake which must be operated to straighten the tractor to facilitate maintaining the tractor on a straight course.

31. The combination with a tractor, of a mower comprising a mower frame structure having cutting mechanism supported thereon, means for connecting said structure to said tractor for both swinging movement in an upright plane and swinging movement in a plane substantially parallel to the ground, means including latching means releasable when the mower strikes an obstruction for normally maintaining the mower in a direction extending laterally with respect to the line of draft, driving means including gearing fixedly mounted on said tractor for operating said cutting mechanism from the power plant of the tractor, and means interposed in said driving means serving to interrupt automatically the drive upon movement of said mower away from said lateral position.

32. The combination with a tractor having a rear end; of a mower comprising a mower frame structure including a member fixedly attached to the rear end of said tractor, mower drive mechanism including gearing supported by said member and fixed with respect to said tractor, an arm extending in back of said rear end and universally connected to said member for swinging movement in upright and substantially horizontal planes, and a cutting mechanism frame part connected to said arm for movement in an upright plane; means including a connection automatically releasable when the mower strikes an obstruction for normally maintaining said cutting mechanism part in a direction extending laterally with respect to the line of draft of the tractor; and lift mechanism for said arm and said cutting mechanism frame part.

33. A track-type tractor mowing machine comprising a body, an endless track mechanism at each side of said body, a mower connected to said body and extending laterally beyond one side thereof, the drag of said mower tending to cause the machine to veer from a straight course in a direction toward said one side, means for effecting steering of said machine comprising a releasable driving connection and a brake for each track mechanism, and an interconnection between the releasable driving connection and the brake associated with the track mechanism at the opposite side of said body to thereby facilitate maintaining of the machine on a straight course.

34. A track-type tractor mowing machine comprising a body, an endless track mechanism at each side of said body, a mower connected to said body and extending laterally beyond one side thereof, the drag of said mower tending to cause the machine to veer from a straight course in a direction toward said one side, means for effecting steering of said machine comprising releasable driving and brake means associated with the track mechanisms, and means interconnecting brake and releasable driving means for simultaneous operation together to facilitate maintaining of the machine on a straight course.

35. A mower attachment adapted to be secured to a tractor having power take-off means, comprising a supporting structure independent of the drawbar of the tractor and adapted to be secured to said tractor adjacent said power take-off means, a drive mechanism supported by said supporting structure in permanently fixed relationship to said power take-off means, and having means for driving connection with said power take-off means, a cutting mechanism, means connecting said cutting mechanism to said supporting structure for swinging movement in a plane substantially parallel to the ground, and a connection from said drive mechanism to said cutting mechanism.

36. A mower attachment adapted to be secured to a tractor having power take-off means, comprising a supporting structure independent of the drawbar of the tractor and adapted to be secured to said tractor adjacent said power take-off means, a drive mechanism supported by said supporting structure in permanently fixed relationship to said power take-off means, and having means for driving connection with said power take-off means, a cutting mechanism, means connecting said cutting mechanism to said supporting structure for swinging movement in a plane substantially parallel to the ground, a connection from said drive mechanism to said cutting mechanism, and releasable means for holding said cutting mechanism against said swinging movement.

37. A mower attachment adapted to be secured to a tractor having power take-off means, comprising a supporting structure, a shaft journaled in said structure in fixed relation with respect to said power take-off means, and means connecting said shaft to said power take-off means including releasable drive establishing means cooperating with said shaft and said power take-off means, said releasable drive establishing means being operable to disconnect or connect said shaft to said power take-off means.

38. A mower attachment adapted to be secured to a tractor having power take-off means, comprising a supporting structure, a shaft journaled in said structure, and means connecting said shaft to said power take-off means including releasable drive establishing means cooperating with said shaft and said power take-off means; said releasable drive establishing means comprising a clutch element journaled about said shaft, a second clutch element mounted for rotation with but axially slidable along said shaft, and resilient means for normally maintaining said clutch elements in engagement.

LOWELL H. THOEN.